United States Patent
Pernleitner et al.

(10) Patent No.: US 12,091,979 B2
(45) Date of Patent: Sep. 17, 2024

(54) SYSTEM WITH A ROTOR BLADE FOR A GAS TURBINE WITH A BLADE ROOT PROTECTIVE PLATE HAVING A SEALING SECTION

(71) Applicant: MTU Aero Engines AG, Munich (DE)

(72) Inventors: Martin Pernleitner, Munich (DE); Dieter Freno, Munich (DE); Manfred Dopfer, Munich (DE)

(73) Assignee: MTU Aero Engines, Munich (DE)

( * ) Notice: Subject to any disclaimer, the term of this patent is extended or adjusted under 35 U.S.C. 154(b) by 108 days.

(21) Appl. No.: 17/764,690

(22) PCT Filed: Aug. 5, 2020

(86) PCT No.: PCT/DE2020/000179
§ 371 (c)(1),
(2) Date: Aug. 2, 2022

(87) PCT Pub. No.: WO2021/063431
PCT Pub. Date: Apr. 8, 2021

(65) Prior Publication Data
US 2023/0003137 A1   Jan. 5, 2023

(30) Foreign Application Priority Data
Oct. 2, 2019 (DE) ............ 10 2019 215 220.1

(51) Int. Cl.
*F01D 11/00* (2006.01)
*F01D 5/30* (2006.01)

(52) U.S. Cl.
CPC .......... *F01D 11/006* (2013.01); *F01D 5/3007* (2013.01); *F01D 5/3092* (2013.01);
(Continued)

(58) Field of Classification Search
CPC ..................................... F01D 5/3092
See application file for complete search history.

(56) References Cited

U.S. PATENT DOCUMENTS

| 9,453,422 B2* | 9/2016 | Hile ............ F01D 5/3015 |
| 11,286,796 B2* | 3/2022 | McCaffrey ...... F01D 11/006 |

(Continued)

FOREIGN PATENT DOCUMENTS

| CH | 526716 A | 8/1972 |
| EP | 2832952 A1 | 2/2015 |

(Continued)

OTHER PUBLICATIONS

International Search Report of PCT/DE2020/000156, dated Oct. 15, 2020.

*Primary Examiner* — Kayla Mccaffrey
(74) *Attorney, Agent, or Firm* — Davidson Kappel LLC

(57) ABSTRACT

A rotor blade system includes a blade root, a blade neck adjoining the blade root, an airfoil adjoining the blade neck, a radially outer partition wall, an axially forward partition wall and an axially rearward partition wall, connected to the radially outer partition wall such that the partition walls surround the blade neck on three sides, the partition walls projecting beyond the blade neck in the circumferential direction, and further including a blade root protection plate designed to be arranged on the blade root. It is provided that the blade root protection plate have at least one sealing portion that extends in the axial direction from the forward partition wall to the rearward partition wall and whose radially outer side is disposed opposite the radially outer partition wall when the blade root protection plate is arranged on the blade root.

18 Claims, 4 Drawing Sheets

(52) U.S. Cl.
CPC .... *F05D 2220/323* (2013.01); *F05D 2250/61* (2013.01); *F05D 2260/36* (2013.01)

(56) References Cited

U.S. PATENT DOCUMENTS

| | | |
|---|---|---|
| 2013/0078101 A1 | 3/2013 | Garin et al. |
| 2014/0271220 A1 | 9/2014 | Leggett |
| 2016/0153303 A1 | 6/2016 | Hough |
| 2017/0145841 A1 | 5/2017 | Congratel et al. |

FOREIGN PATENT DOCUMENTS

| | | |
|---|---|---|
| EP | 2649278 B1 | 7/2017 |
| FR | 2951494 A1 | 4/2011 |
| GB | 1355554 | 6/1974 |
| WO | WO2012076588 A1 | 6/2012 |

\* cited by examiner

SYSTEM WITH A ROTOR BLADE FOR A GAS TURBINE WITH A BLADE ROOT PROTECTIVE PLATE HAVING A SEALING SECTION

The present invention relates to a system with a rotor blade for a gas turbine, in particular an aircraft gas turbine, including a blade root, a blade neck adjoining the blade root in the radial direction, an airfoil adjoining the blade neck in the radial direction, a radially outer partition wall, which forms a radially inner boundary segment of an annular space of a gas turbine, an axially forward partition wall and an axially rearward partition wall, which are connected to the radially outer partition wall such that the partition walls surround the blade neck on three sides, the partition walls projecting beyond the blade neck in the circumferential direction, and further including a blade root protection plate designed to be arranged on the blade root.

Directional words such as "axial," "axially," "radial," "radially," and "circumferential" are taken with respect to the machine axis of the gas turbine, unless explicitly or implicitly indicated otherwise by the context.

SUMMARY OF THE INVENTION

Rotor blades constructed in this manner do not have a radially inner partition wall as in rotor blades known heretofore. In known rotor blades, a radially outer partition wall, a radially inner partition wall, and the axially forward and rearward partition walls form a one-piece (integral) box shape that surrounds the blade neck and in particular projects therebeyond in the circumferential direction. For reasons of weight and because of the difficult tool design for rotor blades with contoured annular space, it is advantageous to omit the radially inner partition wall. This, however, leads to the problem that hot gas ingress can occur in the area of the missing radially inner partition wall, which can lead to unwanted heating of the rotor blade disk.

It is an object of the invention to provide a system having a rotor blade where it is possible to achieve weight savings on the one hand, but also to improve the seal from the annular space carrying the hot gas.

Accordingly, there is provided a system with a rotor blade for a gas turbine, in particular an aircraft gas turbine, including a blade root, a blade neck adjoining the blade root in the radial direction, an airfoil adjoining the blade neck in the radial direction, a radially outer partition wall, which forms a radially inner boundary segment of an annular space of a gas turbine, an axially forward partition wall and an axially rearward partition wall, which are connected to the radially outer partition wall such that the partition walls surround the blade neck on three sides, the partition walls projecting beyond the blade neck in the circumferential direction, and further including a blade root protection plate designed to be arranged on the blade root. It is provided that the blade root protection plate have at least one sealing portion that extends in the axial direction from the forward partition wall to the rearward partition wall and whose radially outer side is disposed opposite the radially outer partition wall when the blade root protection plate is arranged on the blade root.

By providing a sealing portion on the blade root protection plate, it is possible to achieve a sealing effect that counteracts the ingress of hot gas. Since blade root protection plates are already commonly used, the additional sealing portion results in only a minimal increase in weight. In any case, the mass of a sealing portion of the blade root protection plate is significantly less than the mass of a radially inner partition wall.

The partition walls and the blade neck may form a radially downwardly open pocket. When the blade root protection plate is arranged on the blade root, the pocket may be radially downwardly closed by the sealing portion at least partially, preferably completely.

When the system is in an assembled state, the sealing portion may bridge a space formed between a projecting portion of the axially forward partition wall and a projecting portion of the axially rearward partition wall.

Accordingly, the sealing portion of the blade root protection plate covers exactly the area that is left free by the omission of the radially inner partition wall.

The radially outer partition wall, the axially forward partition wall, the axially rearward partition wall, and the sealing portion of the blade root protection plate may form a box-like profile that surrounds the blade neck. The sealing portion may bear with its radially outer side against the axially forward and rearward partition walls or be spaced a very small distance therefrom so as to achieve the desired sealing effect.

In order to obtain an optimum sealing effect, the sealing portion may have substantially the same length as the blade root in the axial direction.

The sealing portion may have at least one corrugation, which is formed in particular along the axial direction or along the circumferential direction. The formation of at least one corrugation results in stiffening of the usually rather thin sealing portion of the blade root protection plate. Thus, the stability of the sealing portion can be improved by providing at least one corrugation. Furthermore, a corrugation may also be designed such that an improved sealing effect is achieved.

The above-mentioned object is also achieved by a rotor blade disk including a plurality of rotor blade slots arranged adjacent one another in the circumferential direction, each having inserted therein a blade root of a respective rotor blade of the system, as described above, and further including a plurality of disk humps formed between the rotor blade slots. The sealing portion of the blade root protection plate is disposed with its radially inner side opposite a radially outer side of a respective disk hump. Thus, the sealing portion may effectively prevent penetration or ingress of hot gas toward the disc humps.

Finally, the above object is also achieved by a gas turbine, in particular an aircraft gas turbine, having at least one such rotor blade disk. The rotor blade disk may in particular be part of a turbine stage of the gas turbine.

BRIEF DESCRIPTION OF THE DRAWINGS

The invention will now be described by way of example, and not by way of limitation, with reference to the accompanying drawings.

DETAILED DESCRIPTION

Figure 1:
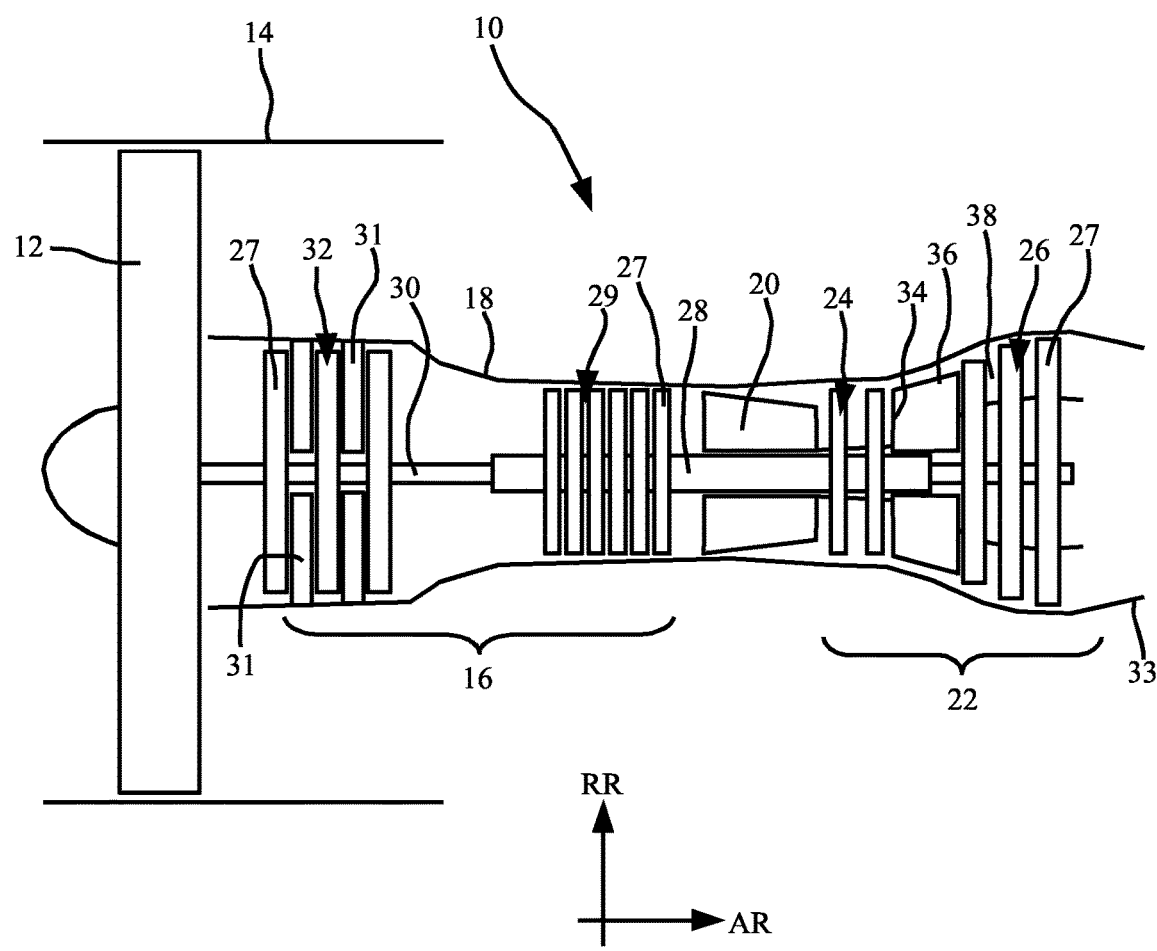
FIG. 1 is a simplified schematic representation of an aircraft gas turbine.

FIG. 1 shows, in simplified schematic form, an aircraft gas turbine 10, illustrated, merely by way of example, as a turbofan engine. Gas turbine 10 includes a fan 12 surrounded by a schematically indicated casing 14. Disposed downstream of fan 12 in the axial direction AR of gas turbine 10 is a compressor 16 that is accommodated in a schematically indicated inner casing 18 and may be single-stage or multi-stage. Disposed downstream of compressor 16 is combustor 20. The flow of hot exhaust gas exiting the combustor then flows through the downstream turbine 22, which may be single-stage or multi-stage. In the present example, turbine 22 includes a high-pressure turbine 24 and a low-pressure turbine 26. A hollow shaft 28 connects high-pressure turbine 24 to compressor 16, in particular a high-pressure compressor 29, so that they are jointly driven or rotated. Another shaft 30 located further inward in the radial direction RR of the turbine connects low-pressure turbine 26 to fan 12 and to a low-pressure compressor 32 so that they are jointly driven or rotated. Disposed downstream of turbine 22 is an exhaust nozzle 33, which is only schematically indicated here.

In the illustrated example of an aircraft gas turbine 10, a turbine center frame 34 is disposed between high-pressure turbine 24 and low-pressure turbine 26 and extends around shafts 28, 30. Hot exhaust gases from high-pressure turbine 24 flow through turbine center frame 34 in its radially outer region 36. The hot exhaust gas then flows into an annular space 38 of low-pressure turbine 26. Compressors 29, 32 and turbines 24, 26 are represented, by way of example, by rotor blade rings 27. For the sake of clarity, the usually present stator vane rings 31 are shown, by way of example, only for compressor 32.

The following description of an embodiment of the invention relates in particular to the rotor blades that may be used in a rotor blade ring 27 of compressor 16 or of turbine 22.

Figure 2:
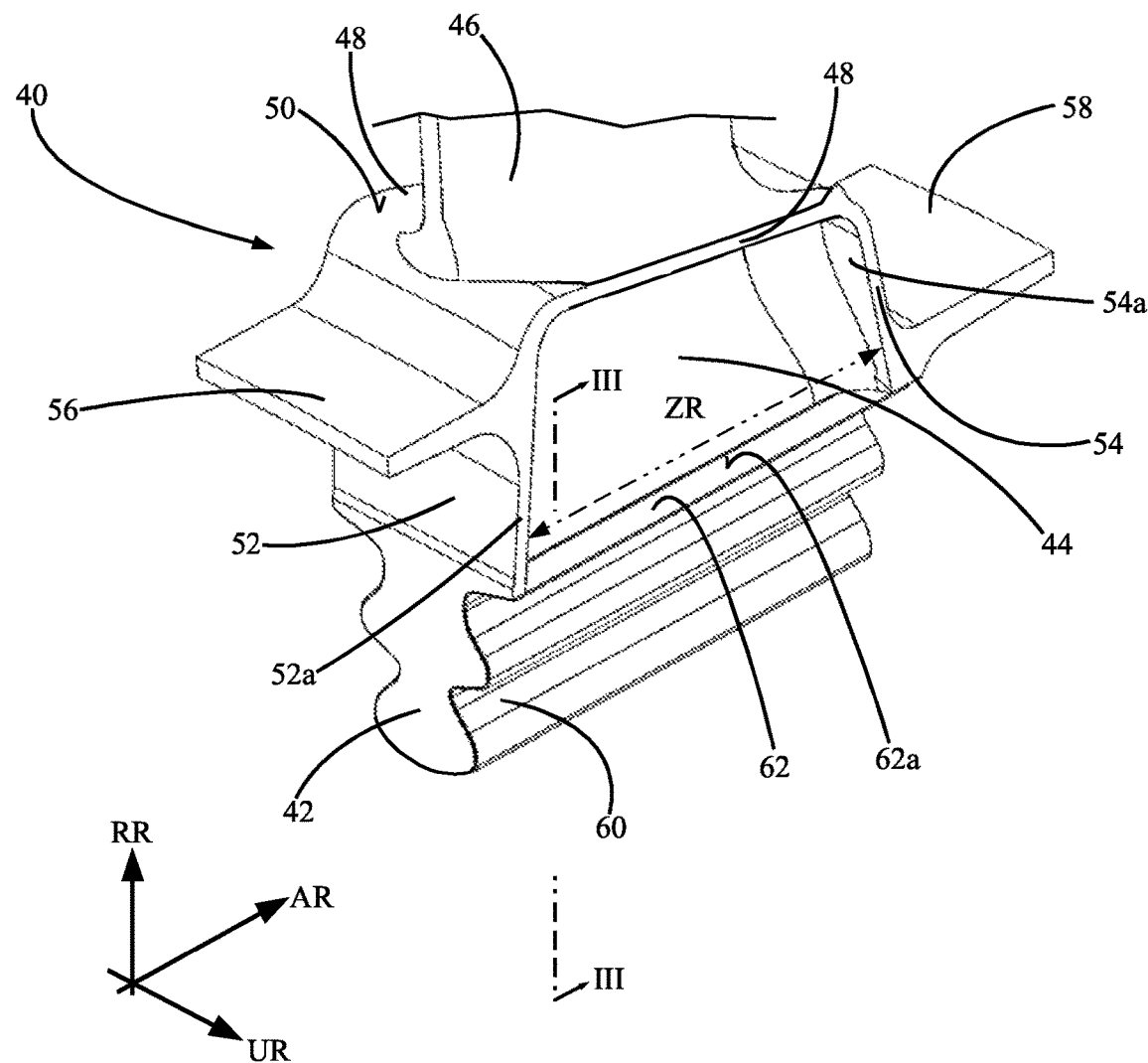
FIG. 2 is a simplified and schematic perspective view of a rotor blade with a blade root protection plate.

FIG. 2 shows a simplified and schematic perspective view of a rotor blade 40 for a system according to the invention. Rotor blade 40 includes a blade root 42. Blade root 42 is here formed, by way of example, with so-called fir-tree shape. In the radial direction RR, blade root 42 is adjoined by a blade neck 44. Blade neck 44 merges into airfoil 46.

Rotor blade 40 further includes a radially outer partition wall 48 disposed between airfoil 46 and blade neck 44. Radially outer side 50 of partition wall 48 forms part of an annular space of a gas turbine when blade 40 is installed in its intended position in a gas turbine. Rotor blade 40 further includes an axially forward partition wall 52 and an axially rearward partition wall 54. Axially forward partition wall 52 and the axially rearward partition wall 54 are connected to, in particular integrally formed with, radially outer partition wall 48. As can be seen from FIG. 2, partition walls 48, 52, 54 surround blade neck 44 on three sides. A forward shroud portion 56 and a rearward shroud portion 56 may each be connected to a respective one of partition walls 52, 54.

A blade root protection plate 60 is disposed along blade root 42, in particular along the outer contour thereof. Blade root protection plate 60 includes a sealing portion 62 in the radially outer region. Sealing portion 62 extends in the axial direction AR from forward partition wall 52 to rearward partition wall 54. In particular, sealing portion 62 bridges a space ZR formed between forward partition wall 52 and rearward partition wall 54. The sealing portion is in particular dimensioned such that it bridges the space ZR formed between a projecting portion 52a of axially forward partition wall 52 and a projecting portion 54a of axially rearward partition wall 54. Portions 52a, 52 project in the circumferential direction UR beyond blade neck 44. A radially outer side 62a of sealing portion 62 is disposed in the radial direction RR opposite the radially outer partition wall 48.

Figure 3:
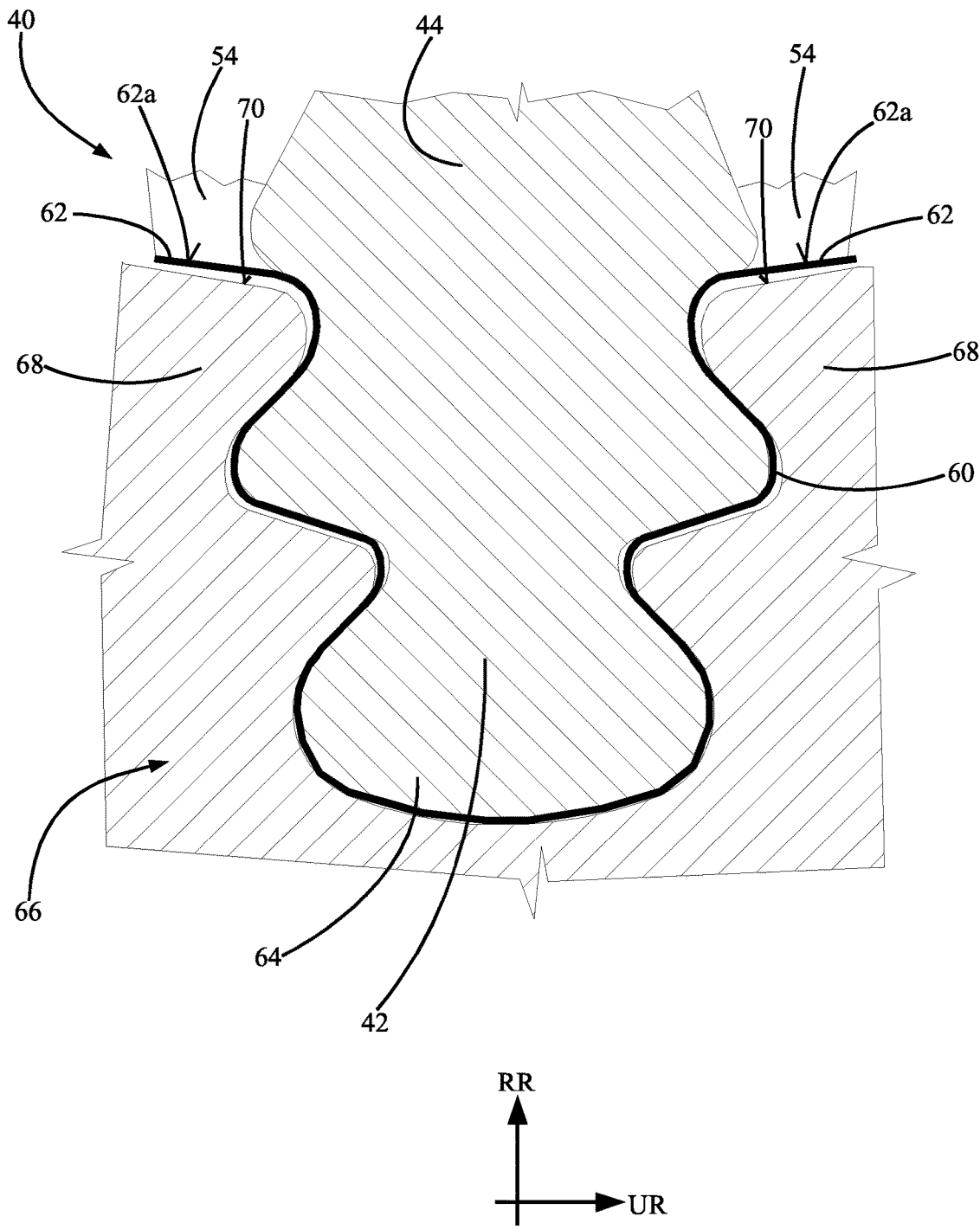
FIG. 3 is a sectional view taken substantially along line III-III of FIG. 2.

FIG. 3 shows a simplified and schematic sectional view taken substantially along line III-III of FIG. 2, depicting blade root 42 received in a blade root slot 64 of a rotor blade disk 66. Rotor blade disk 66 typically includes a plurality of rotor blades 40 arranged adjacent one another in the circumferential direction UR. Each blade root 42 is received between two adjacent disk humps 68 of rotor blade disk 66.

Also shown in FIG. 3 is the blade root protection plate 60, which is shown in simplified form as a thick black line. Blade root protection plate 60 includes the sealing portion 62 in the radially outer region. Sealing portion 62 is disposed opposite a respective radially outer surface 70 of a respective disk hump 68. In particular, sealing portion 62 covers the respective disk hump 68 at least partially. In the axial direction, a portion of rearward partition wall 54 can also be seen.

When FIGS. 2 and 3 are viewed together, it can be seen that partition walls 48, 52, 56 and sealing portion 62 together form a kind of box-shaped profile that surrounds or encloses blade neck 44. Sealing portion 62 may have an axial length substantially equal to the axial length of blade root 42. In other words, it may be said that partition walls (48, 52, 54) and blade neck (44) form a radially downwardly open pocket, and that when blade root protection plate (60) is arranged on blade root (42), the pocket is radially downwardly closed by sealing portion (62) at least partially, in particular completely.

Figure 4:
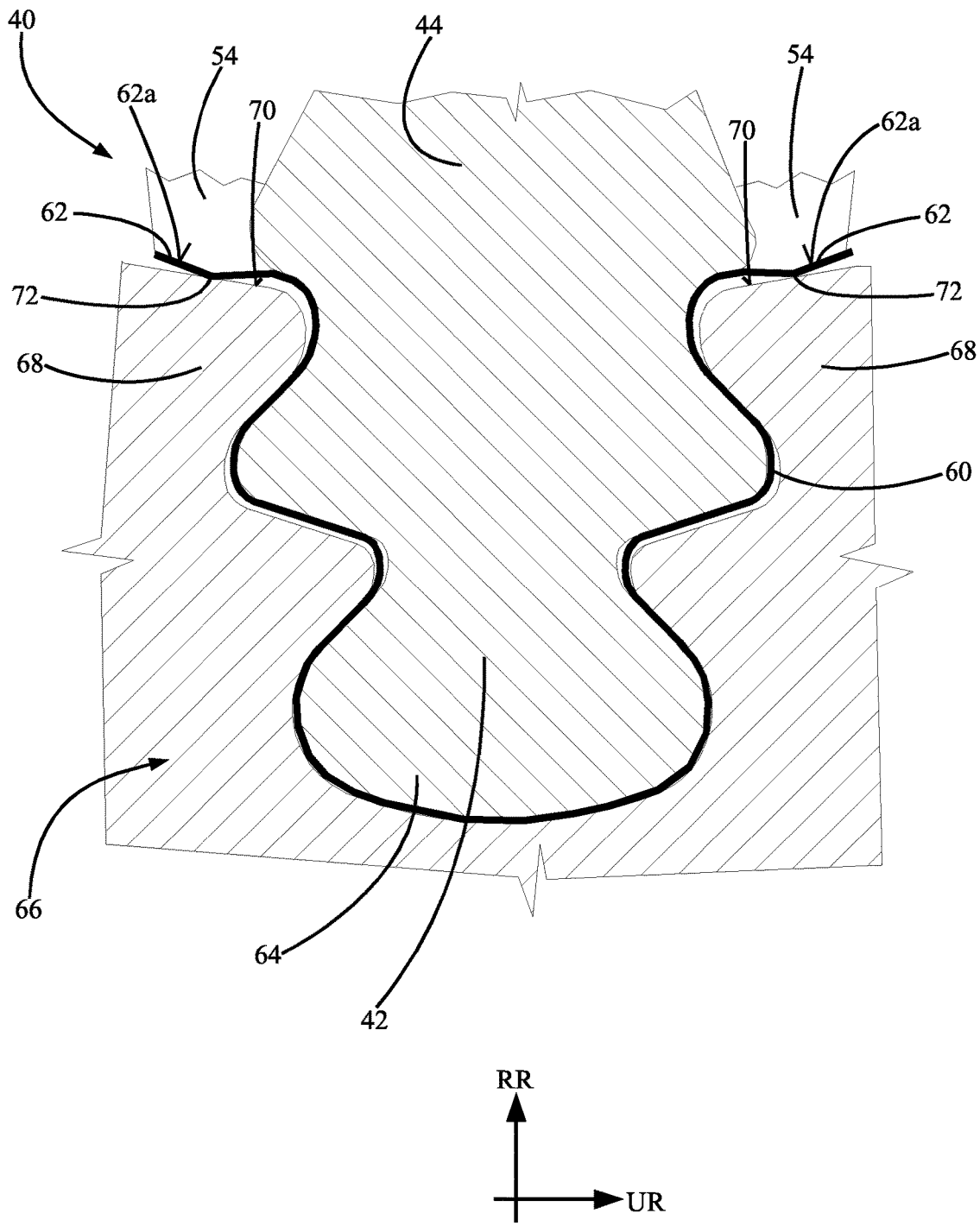
FIG. 4 is a sectional view similar to FIG. 3, where a corrugation is formed in a sealing portion of the blade root protection plate.

FIG. 4 is a sectional view similar to FIG. 3 but of a further embodiment. Therefore, in FIG. 4, the same reference numerals are shown as in FIG. 3, even if these are not described again with reference to FIG. 4. FIG. 4 shows an exemplary embodiment where sealing portion 62 has formed therein a corrugation 72 that extends along the axial direction. Sealing section 62 may have not only one corrugation 72 formed therein. It is also possible, for example, that a plurality of corrugations may be formed which extend parallel or transversely to one another. In particular, it is also possible to provide a plurality of corrugations running in the circumferential direction UR and arranged substantially parallel and adjacent to one another along the axial direction. The formation of one or more corrugation(s) 72 serves in particular to stiffen and stabilize sealing portion 62, which is made as part of blade root protection plate 60 from a relatively thin sheet metal material.

LIST OF REFERENCE NUMERALS 10 aircraft gas turbine
12 fan
14 casing
16 compressor
18 inner casing
20 combustor
22 turbine
24 high-pressure turbine
26 low-pressure turbine
27 rotor blade ring
28 hollow shaft
29 high-pressure compressor
30 shaft
31 stator vane ring
32 low-pressure compressor
33 exhaust nozzle
34 turbine center frame
36 radially outer region
38 annular space
40 rotor blade 42 blade root
44 blade neck
46 airfoil
48 radially outer partition wall
50 radially outer side of the partition wall
52 axially forward partition wall
52a projecting portion
54 axially rearward partition wall
54a projecting portion
56 forward shroud portion
58 rearward shroud portion
60 blade root protection plate
62 sealing portion
62a radially outer side
64 blade root slot
66 rotor blade disk
68 disk hump
70 radially outer surface of the disk hump
72 corrugation

The invention claimed is:

1. A system with a rotor blade for a gas turbine, the system comprising:
a blade root;
a blade neck adjoining the blade root in a radial direction;
an airfoil adjoining the blade neck in the radial direction;
a radially outer partition wall forming a radially inner boundary segment of an annular space of a gas turbine;
an axially forward partition wall and an axially rearward partition wall connected to the radially outer partition wall such that the axially forward, axially rearward and radially outer partition walls surround the blade neck on three sides, the axially forward, axially rearward and radially outer partition walls projecting beyond the blade neck in the circumferential direction; and
a blade root protection plate designed to be arranged on the blade root and having at least one sealing portion extending in the axial direction from the forward partition wall to the rearward partition wall, the sealing portion extending circumferentially at a radially outward end of the blade root protection plate to have a radially outwardly facing side facing the radially outer partition wall when the blade root protection plate is arranged on the blade root and to have a radially inwardly facing side facing away from the radially outer partition wall,
wherein the sealing portion directly contacts the axially forward partition wall.

2. The system as recited in claim 1, wherein the axially forward, axially rearward and radially outer partition walls and the blade neck form a radially downwardly open pocket, and in that when the blade root protection plate is arranged on the blade root, the pocket is radially downwardly closed by the sealing portion at least partially.

3. The system as recited in claim 1, wherein the axially forward, axially rearward and radially outer partition walls and the blade neck form a radially downwardly open pocket, and in that when the blade root protection plate is arranged on the blade root, the pocket is radially downwardly closed completely by the sealing portion.

4. The system as recited in claim 1, wherein when the system is in an assembled state, the sealing portion bridges a space formed between a projecting portion of the axially forward partition wall and a projecting portion of the axially rearward partition wall.

5. The system as recited in claim 1, wherein the radially outer partition wall, the axially forward partition wall, the axially rearward partition wall, and the sealing portion of the blade root protection plate form a box-profile surrounding the blade neck.

6. The system as recited in claim 1, wherein the sealing portion has a same length as the blade root in the axial direction.

7. The system as recited in claim 1, wherein the sealing portion has at least one corrugation formed along the axial direction or along the circumferential direction.

8. The system as recited in claim 1, wherein the sealing portion has at least one corrugation formed along the axial direction.

9. A rotor blade disk comprising a plurality of rotor blade slots arranged adjacent one another in the circumferential direction, each having inserted therein a blade root of a respective rotor blade of the system as recited in claim 1, and further comprising a plurality of disk humps formed between the rotor blade slots, the sealing portion of the blade root protection plate being disposed with a radially inner side opposite a radially outer side of a respective disk hump.

10. A turbine stage of a gas turbine comprising the rotor blade disk as recited in claim 9.

11. A gas turbine comprising the rotor blade disk as recited in claim 9.

12. An aircraft gas turbine comprising the gas turbine as recited in claim 11.

13. The rotor blade disk as recited in claim 9, wherein the radially inwardly facing side faces a radially outer surface of one of the plurality of disk humps.

14. An aircraft gas turbine comprising the system as recited in claim 1.

15. The system as recited in claim 1, wherein the radially inwardly facing side faces a radially outer surface of a disk hump.

16. The system as recited in claim 1, wherein the blade root has two circumferentially thickened areas to define a fir tree blade root, the blade root protection plate covering the two circumferentially thickened areas.

17. The system as recited in claim 1, wherein the blade root has a curved outer surface and the blade root protection plate has a thickness dimensioned to allow the blade root protection plate to be curved to match the curved outer surface.

18. The system as recited in claim 1, wherein the sealing portion has a corrugation extending axially.

* * * * *